United States Patent [19]

Krueger et al.

[11] Patent Number: 5,037,273

[45] Date of Patent: Aug. 6, 1991

[54] COMPRESSOR IMPELLER

[75] Inventors: Wolfgang Krueger, Reichertshausen; Hans-Juergen Schmuhl, Woerthsee, both of Fed. Rep. of Germany

[73] Assignee: MTU Motoren- und Turbinen-Union Munchen GmbH, Fed. Rep. of Germany

[21] Appl. No.: 450,683

[22] Filed: Dec. 14, 1989

[30] Foreign Application Priority Data

Dec. 19, 1988 [DE] Fed. Rep. of Germany ..... 38427109

[51] Int. Cl.$^5$ ............................................. F01D 5/22
[52] U.S. Cl. .................................. 416/190; 416/191; 416/192; 415/173.6
[58] Field of Search ............... 416/181, 189, 190, 191, 416/192, 194, 195, 241 B; 415/173.6

[56] References Cited

U.S. PATENT DOCUMENTS

| 2,801,076 | 7/1957 | Terrell et al. | 416/189 |
| 3,095,138 | 6/1963 | Warnken | 416/190 |
| 3,556,675 | 1/1971 | Howald et al. | 416/195 X |
| 3,867,060 | 2/1975 | Huber | 415/173.6 X |
| 3,951,612 | 4/1976 | Gates et al. | 416/241 B X |
| 4,696,866 | 9/1987 | Tanaka et al. | 416/230 X |

FOREIGN PATENT DOCUMENTS

| 733918 | 7/1955 | United Kingdom | 416/191 |
| 1299929 | 12/1972 | United Kingdom | 416/189 |

Primary Examiner—Edward K. Look
Assistant Examiner—James A. Larson
Attorney, Agent, or Firm—Evenson, Wands, Edwards, Lenahan & McKeown

[57] ABSTRACT

A compressor impeller has a ring-shaped shroud band which is mounted at blade tips, each blade tip being enclosed in an identical radially slidable manner by a guide block, and the guide blocks being fastened to the shroud band. As a result, a narrow sealing gap and thus lower aerodynamic losses can be implemented than in conventional compressors, and the different centrifugally and thermally induced expansions of the blade and of the shroud band can be compensated.

14 Claims, 2 Drawing Sheets

COMPRESSOR IMPELLER

BACKGROUND AND SUMMARY OF THE INVENTION

The invention relates to a compressor impeller having a number of compressor blades distributed over a circumference thereof.

In turbo-engines, the sealing gap between the rotating blades and the stationary engine housing represents an influencing variable which is of considerable significance for the efficiency of the engine. It is therefore important to keep this sealing gap as small as possible which, because of the high thermal and centrifugal stresses at the blades, proves to be extremely difficult. In order to minimize the sealing gap, it is known to provide turbines with an exterior shroud band, thereby preventing a direct flow around the rotor blade tip. However, exterior shroud bands of this type cannot be produced from one piece because of the strengths of the presently available materials are not sufficient for withstanding the stresses which occur there. For this reason, these shroud bands are composed of individual sections, the number of sections corresponding to the number of blades of one stage, and these sections being molded to the blade tips.

However, this type of a construction is not possible in the compressor field because compressor efficiency, in contrast to that of turbines, is very considerably based on the fact that the blades must be much thinner and must have a slighter curvature as well as sharp leading and trailing blade edges. Therefore, for reasons of strength, it is not possible to mold or mount section-type shroud bands on the outside of compressor blades.

Further, a closed shroud band presents problems because, during operation, the expansions of the compressor disk, the individual blades and the shroud band may mutually interfere with one another and, under certain operating conditions result in tension forces occurring at the shroud band/blade connection which become extremely high. Because of the centrifugal tensions, which are superimposed on one another as well as the thermal stresses which are the result of the high temperatures of up to approximately 600 degrees C. occurring in the operation of modern compressors, it has not been possible so far to produce such one-piece shroud bands.

Thus, it is an object of the present invention to provide a one-piece shroud band for a compressor impeller which can be connected with the compressor impeller without the mutual impairment of the different expansions of the components, and the shroud band is simultaneously centered at the impeller. In addition, a sealing gap between the shroud band and the engine housing is to be achievable which is as narrow as possible.

According to preferred embodiments of the present invention, this object and other objects are achieved in that a ring-shaped shroud band is mounted at the blade tips and each blade tip, slidably in a radial direction, is enclosed by a guide block, the guide blocks being fastened to an interior side of a self-supportingly constructed shroud band.

Advantages of this arrangement include that the shroud band, similar to a centering of spokes, is connected to the compressor impeller. The expansions of the compressor disk and of the rotor blades, as a result of the centrifugal force and the temperatures, lead to a radial shifting of a blade neck in the guide block. At the same time, the self-supportingly constructed shroud band is not affected by these expansions. The expansions of the compressor disk and the rotor blades therefore have no influence on the sealing gap between the shroud band and the engine housing.

This sealing gap is influenced mainly by the expansion of the shroud band and by housing expansions. By a suitable selection of material, the expansion of the shroud band may advantageously be kept at a minimum and, at the same time, the thermally caused expansion of the housing may be coordinated with that of the shroud band, for example, by means of cooling, the selection of material or mechanical pressure devices. The minimizing of the sealing gap can therefore be adapted exclusively to the characteristics of the material of the shroud band, whereas any influences of the other rotating components do not have to be taken into account.

In addition to the improvement of the sealing gap, it is also an advantage that the blade vibrations can be reduced considerably (high damping) and the resistance to strikes by foreign objects can be increased significantly. In addition, an unwinding or untwisting of the blade area during the operation can be prevented. Thus, advantageously, the staggering angle of the blades remains unchanged over the whole rotational-speed range.

In an advantageous further embodiment of the invention, the blade tips are widened for the formation of guide surfaces for interaction with the guide blocks. As a result, the guide surfaces can be precisely manufactured and machined. The guide surfaces are also coated with a coating which inhibits frictional corrosion, thus reducing the danger of fretting. Particularly suitable coatings include those made of tungsten carbide, titanium carbide or titanium nitride.

In an advantageous further embodiment of the invention, filler pieces are provided in intermediate sections between two adjacent guide blocks respectively, these filler pieces being aerodynamically adapted to the blade contour and to the guide block contour. These filler Pieces, which are preferably form-lockingly connected with the shroud band, are made of a material of low density, whereby the overall weight of the arrangement can be lowered considerably without the requirement of accepting a reduction in strength. Titanium foam is particularly suitable for use as the material for the filler pieces since this material has a low density while being resistant to temperature influences and exhibiting a high stiffness.

Another advantageous embodiment of the invention provides that the hollow space in the interior of each guide block between the shroud band and the blade tips is connected with a space downstream of the compressor impeller by way of one or several bores. As a result, it is prevented that the sliding guide between the blade tip and the guide block becomes dirty since air from the area of higher pressure downstream of the compressor blade can penetrate into the hollow space through the bore. The leakage air at the sliding fit therefore takes along dirt particles and prevents a penetrating of the dirt particles between the sliding surfaces.

A preferred embodiment of the invention provides that the material of the shroud band is fiber-reinforced metal, particularly SiC-fiber with a titanium and/or aluminum matrix. Materials of this type have an extraordinarily high strength and, in addition, are so heat-resistant that they can be used in the temperatures of up to approximately 600° C. (in the case of a Ti matrix) which exist in the compressor area. In addition, these materials also have a very high E-module, whereby the centrifugal-force-induced expansions may be reduced to a minimum. As a result, the sealing gap can be kept approximately constant even in different operating conditions, particularly at different rotational speeds.

In a further advantageous manner, the shroud band has at least one sealing web extending in a circumferential direction so that a sealing gap is situated between the sealing web and the outer housing of the flow duct. This arrangement, which is known in principle, permits a defined adjustment of the sealing gap by the working of small surfaces. In the case of two or several of such sealing webs, aerodynamic phenomena, such as turbulences or the like, contribute to a reduction of the gap flow.

Normally, two sealing webs of this type must be mounted on the shroud band axially behind one another, since this increases the sealing effect with respect to a single sealing web. In this case, the sealing web or webs are made, preferably, of a matrix material, specifically such that by means of a suitable manufacturing process for the shroud band, it is taken into account that the area of the sealing webs to be manufactured remains free of fiber material so that, when the matrix material is filled in, these sealing webs are filled out only by this matrix material.

In order to achieve a sufficient adhesion of sealing webs to the shroud band, the sealing webs, in their cross-section, are provided with a broad base in the area in which the fibers of a fiber-reinforced shroud band end. As a result, a sufficient connection is achieved of the matrix metal between the fibers with the metallic sealing web. In a radially outside direction, i.e., in the direction toward a sealing gap d between the shroud band and housing, the sealing web tapers superproportionally, which is desirable for reasons of centrifugal stress. This also reduces the mass of the sealing ring. A construction of this type has the advantage that repair work can be carried out easily and at reasonable cost by build-up welding of the sealing webs. As an alternative, it is also possible to construct the sealing webs completely of fiber-reinforced material.

As an alternative to the above-mentioned construction, the guide block is widened in a circumferential direction to such an extent that they abut and the filler pieces are no longer required. This type of a construction, which is simpler with respect to manufacturing techniques, is advantageous when fiber-reinforced metals are used which have sufficient strength.

For the manufacturing of a shroud band according to advantageous embodiments of the present invention, the guide blocks are first placed on the blade tips of the rotor blades. Subsequently, the shroud band with the filler pieces is pushed over the compressor impeller. In a further work step, the compressor impeller and the shroud band are centered with respect to one another in a device, the guide blocks are pushed radially toward the outside and, in this position, are connected with the shroud band in a material-locking manner, particularly by soldering, diffusion-connecting or clamping.

The compressor impellers may be constructed according to the blisk (blade and disk) construction method a well as in the form of individual blades. In the latter construction, the blades, as known, may be inserted either into circumferential grooves or into individual grooves. In the case of the construction with individual grooves, the guide blocks may be connected, in a form-locking manner, with the shroud band before the assembly, or may be a component of the shroud band. During the assembly, the rotor blades are first inserted into the guide blocks of the shroud band. Then the whole set of blades is pushed into the grooves of the compressor disk.

Another advantage of preferred embodiments of the invention in connection with the fan blades is that the aerodynamic losses are reduced because the interfering snubbers are absent.

Other objects, advantages and novel features of the present invention will become apparent from the following detailed description of the invention when considered in conjunction with the accompanying drawings.

DETAILED DESCRIPTION OF THE DRAWINGS

In the following, advantageous embodiments of the invention are explained in detail with reference to the drawings.

Figure 1:
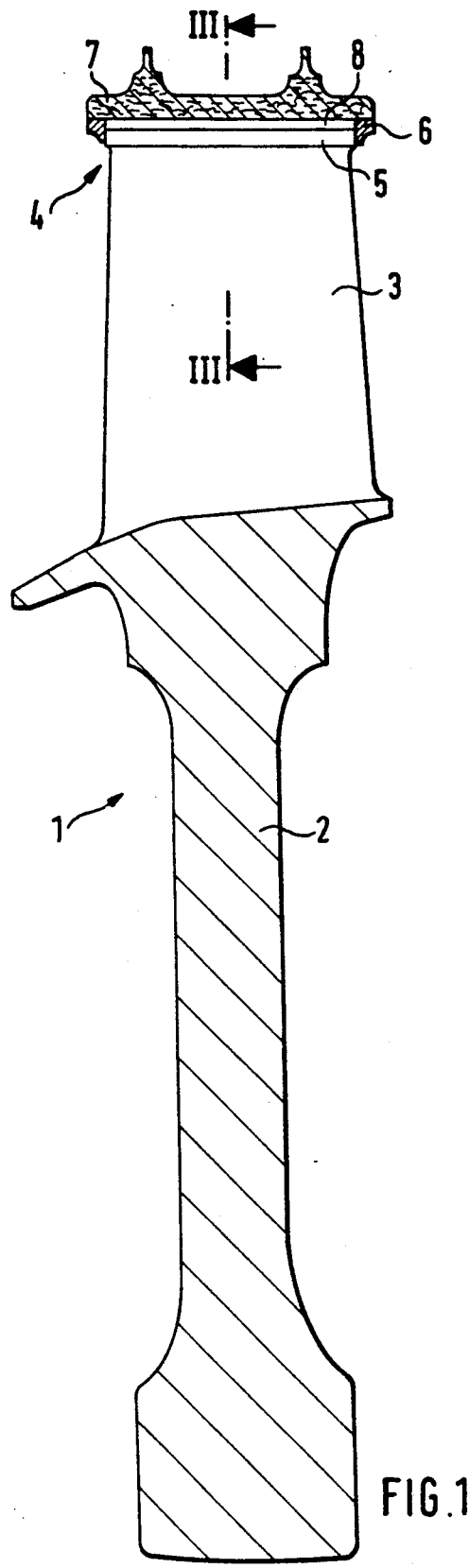
FIG. 1 is a longitudinal sectional view of an integral compressor impeller.
Figure 4:
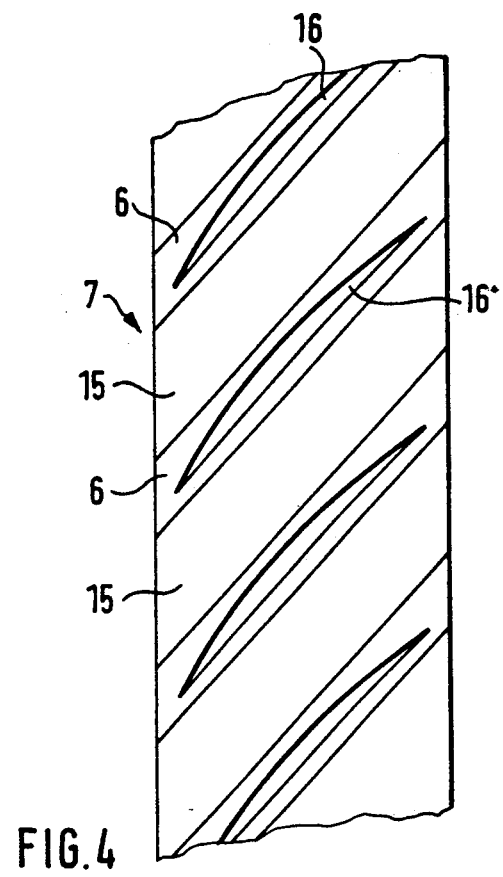
FIG. 4 is a schematic view of the shroud band radially from the inside.

In FIG. 1, a longitudinal sectional view of an integral compressor impeller 1 shows an impeller disk 2, at an outer circumference of which are mounted evenly distributed compressor blades 3. The shown compressor blade 3 has a blade tip 4 which is slightly widened to form a rotating guide surface 5. The guide surface 5 is slidingly connected with a breakthrough 16 of a guide block 6 as shown in FIG. 4, this breakthrough 16 being constructed in an adapted manner, and the guide block 6 being fastened to the ring-shaped shroud band 7. In this case, a hollow space 8 remains between the blade tip 4 and the shroud band 7, the size of which depends on the operating condition.

Figure 2:
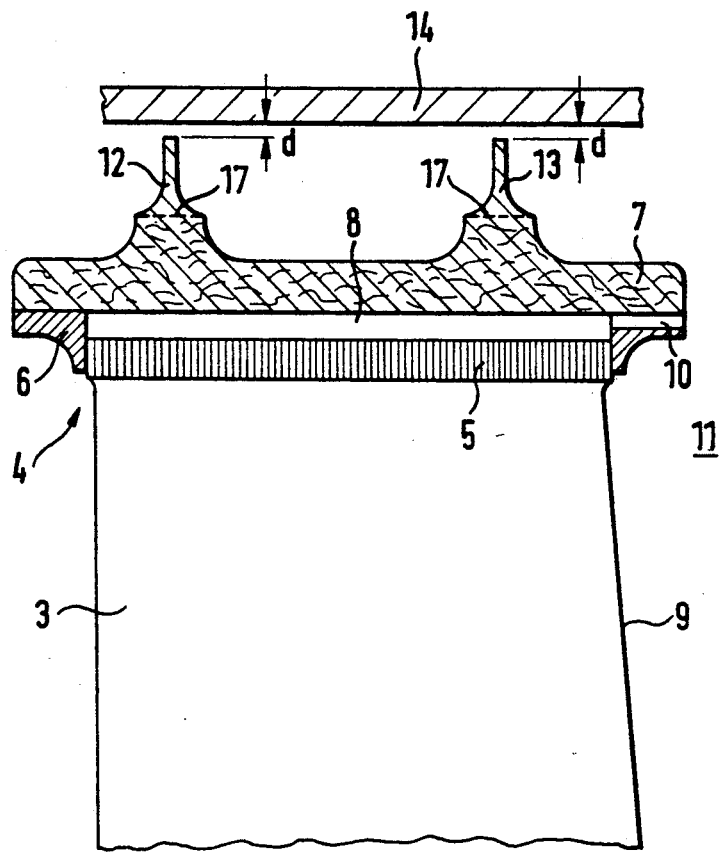
FIG. 2 is an enlarged cut-out of the compressor impeller according to FIG. 1.

In FIG. 2, the area of the blade tip 4 is shown in an enlarged view. In addition to the elements indicated above, it is shown that the guide block 6 has a bore 10 in the area of the trailing edge 9 of the blade by means of which the hollow space 8 communicates with a space 11 downstream of the compressor blade 3.

At its outer circumference, the shroud band 7 is provided with two rotary sealing webs 12, 13 which, interacting with an exterior flow duct housing 14, each define a sealing gap d.

The sealing webs 12 and 13 are manufactured without any fibers; i.e., they are made only of matrix material. In this case, the sealing webs 12, 13 are not separate components, but are manufactured together with the shroud band 7, the fiber material ending, for example, in the area of lines 17 in a radial outside direction. The sealing webs 12, 13 thus form an integrally manufactured component with the shroud band 7.

Figure 3:
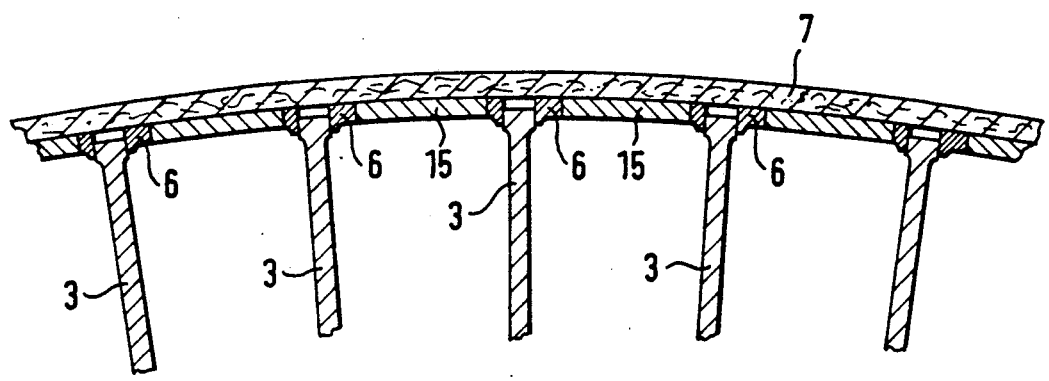
FIG. 3 is a schematic cross-sectional view of the shroud band according to Line III—III of FIG. 1.

FIG. 3 is a cross-sectional view through the sealing ring 7 which extends along Line III—III according to FIG. 1. Several blades 3 are shown schematically which are each slidably disposed in the guide blocks 6. Filler pieces 15 are provided in the spaces between the individual guide blocks 6, these filler pieces being connected with the shroud band 7. These filler pieces 15 are also shaped such that they are aerodynamically adapted to the shape of the guide blocks 6 and of the shroud band 7 and thus cause the lowest Possible flow resistance.

FIG. 4 is a view of the shroud band 7 radially from the inside, showing the breakthroughs 16 in the guide blocks 6 which are adapted to the blade contour. In addition, the filler pieces 15 are visible in the spaces between the individual guide blocks 6.

Figure 5A:
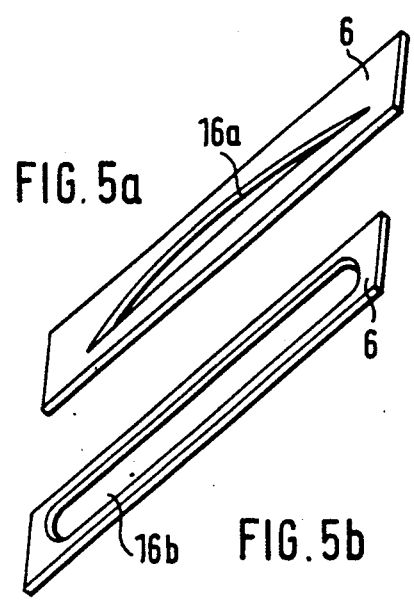
FIG. 5a is a schematic view of a guide block.
Figure 5B:
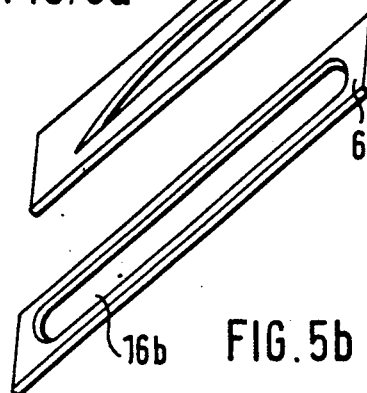
FIG. 5b is a schematic view of an alternative guide block.

FIGS. 5a and 5b show two alternative constructions of the breakthroughs 16. The construction shown in FIG. 5a has breakthroughs 16a which are fairly precisely adapted to the blade contour of the compressor blade 3. In contrast, the construction according to FIG. 5b shows an approximately oblong-hole type breakthrough 16b which is easier and thus less expensive to manufacture than the breakthrough 16a according to FIG. 5a. In the case of this construction, the blade tips 4 (FIG. 1) should be constructed correspondingly so that their guide surfaces 5 are adapted to the contour of the breakthroughs. In preferred embodiments, the guide blocks are made of material containing titanium or aluminum base alloy.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A compressor impeller having a plurality of compressor blades distributed over a circumference thereof, wherein a ring-shaped shroud band is mounted at blade tips of the compressor blades, and each blade tip is enclosed by a guide block slidable onto an associated blade tip in a radial direction, the guide blocks being fastened to an interior side of the shroud band, wherein at least one of the blade tips is widened to form a guide surface for interacting with an associated guide block.

2. A compressor impeller according to claim 1, wherein at least one of the guide surfaces is coated with a frictional-corrosion-inhibiting coating.

3. A compressor impeller according to claim 2, wherein the frictional-corrosion-inhibiting coating is formed with tungsten carbide, titanium carbide or titanium nitride.

4. A compressor impeller according to claim 1, wherein at least one of the blade tips projects into an associated guide block only so far that a hollow space remains between the shroud band and the at least one blade tip under all operating conditions.

5. A compressor impeller according to claim 1, wherein a filler piece is provided in an intermediate section between two adjacent guide blocks, respectively, the filler piece being aerodynamically adapted to a blade contour of the blades and a guide block contour of the guide blocks.

6. A compressor impeller according to claim 5, wherein the filler piece is made of a foam material.

7. A compressor impeller according to claim 6, wherein the material of the filler piece is titanium foam.

8. A compressor impeller according to claim 1, wherein a hollow space in an interior of at least one guide block is connected with a space downstream of the compressor impeller by at least one bore.

9. A compressor impeller according to claim 1, wherein the shroud band is made of a fiber-reinforced metal material.

10. A compressor impeller according to claim 9, wherein the material of the shroud band is SiC fiber with at least one of a titanium matrix and an aluminum matrix.

11. A compressor impeller according to claim 1, wherein the guide blocks are made of material containing titanium or aluminum base alloy.

12. A compressor impeller according to claim 1, wherein the shroud band has at least one radial sealing web extending in a circumferential direction for forming a sealing gap located between the sealing web and an outside housing of a flow wall.

13. A compressor impeller according to claim 12, wherein the at least one sealing web is made of a matrix material.

14. A compressor impeller according to claim 12 wherein the at least one sealing web, starting out from a wide base thereof in an area in which fibers of a fiber-reinforced shroud band end, tapers superproportionally towards a direction of the sealing gap.

* * * * *